F. S. BYINGTON.
TIRE.
APPLICATION FILED JAN. 2, 1913.
1,085,376. Patented Jan. 27, 1914.
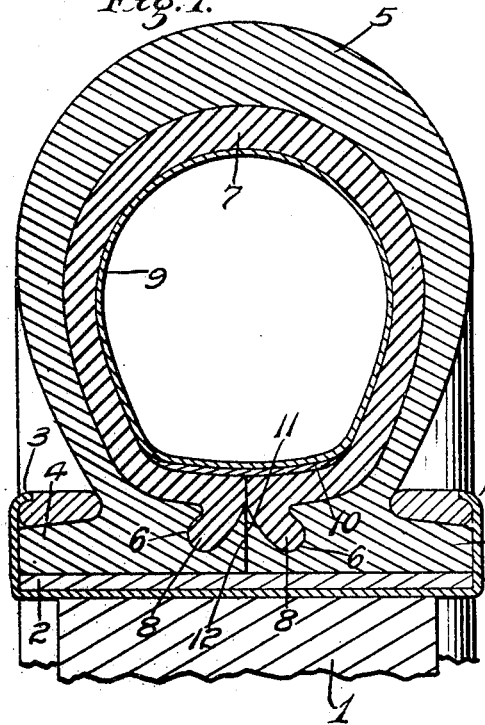
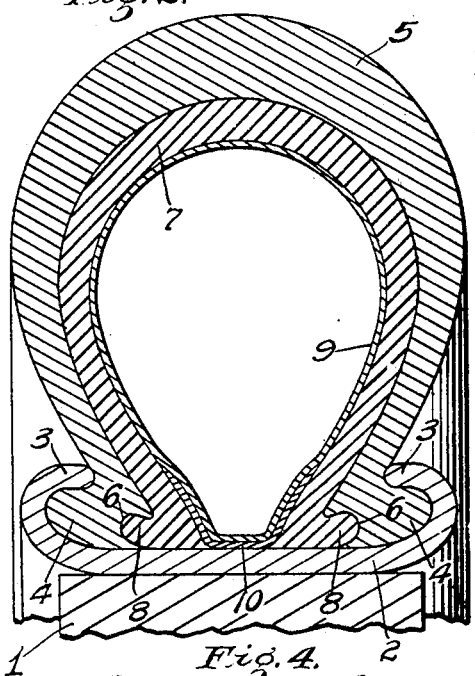
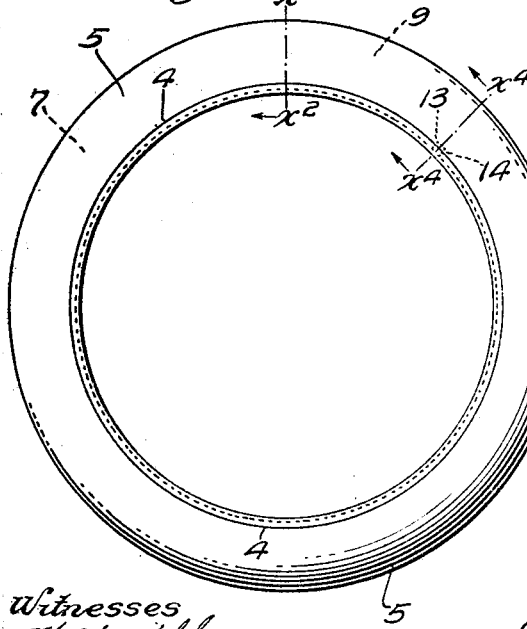
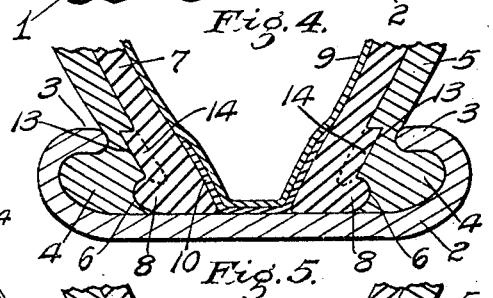
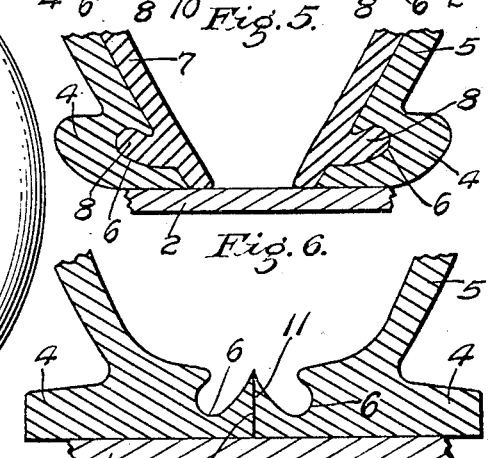
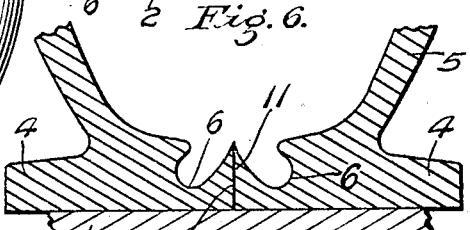
Witnesses
Inventor:
Frank S. Byington

UNITED STATES PATENT OFFICE.

FRANK S. BYINGTON, OF LOS ANGELES, CALIFORNIA.

TIRE.

1,085,376. Specification of Letters Patent. Patented Jan. 27, 1914.

Application filed January 2, 1913. Serial No. 739,907.

*To all whom it may concern:*

Be it known that I, FRANK S. BYINGTON, a citizen of the United States, residing at Los Angeles, in the county of Los Angeles and State of California, have invented a new and useful Tire, of which the following is a specification.

This invention relates to a novel pneumatic tire wherein a division of the forces acting on the ordinary outer tire casing is effected, so that said outer casing, as used in this invention, only sustains the wear and tear of the road, the tension of the inflated pneumatic tube within said tire being sustained by a separate inner casing which is suitably locked or bound onto the wheel rim near its inner periphery.

The chief object of this invention is to materially prolong the life of a pneumatic tire, and to this end novel means are provided for relieving the outer tire casing from the tension or strain of the inflated pneumatic tube.

Other objects may appear in consideration of the appended detailed description and also by inspection of the drawings accompanying this application.

The accompanying drawings illustrate the invention.

Figure 1 is a fragmental axial section of a wheel which is provided with one form of tire embracing this invention. Fig. 2 is a similar section showing another form of tire embodying this invention, and this section is taken on line $x^2$—$x^2$, Fig. 3. Fig. 3 is a side view of a wheel rim with a tire attached. Fig. 4 is another fragmental axial section through the same tire shown in Fig. 2 and taken on line $x^4$—$x^4$, Fig. 3. Fig. 5 shows in section a modification in certain parts of the general tire construction of Fig. 2. Fig. 6 illustrates in section a detached fragmental portion of the outer tire casing shown in Fig. 1.

In the figures the wheel rim is shown comprising the body 1 and flange 2, and into the overhanging portions 3 of said flange are sprung the usual annular shoulders 4 of an outer tire casing 5. At any suitable places around the inner face of said outer tire casing and on either side of same, are formed two sockets 6 which usually extend around the whole wheel. Within said outer tire casing 5 is placed another separate casing 7 having shoulders 8 adapted to be sprung into sockets 6 of the outer tire casing. Within the inner casing 7 is placed a pneumatic tire tube 9 of ordinary construction, and the same is adapted to be inflated in any well-known manner, a soft smooth flap 10 being placed along the inner periphery of said tube for the purpose of protecting its inner periphery.

In the tire shown in Fig. 1 the base of the outer casing is formed with two vertical faces 11 and 12 adapted to abut on one another, and the sockets 6 and shoulders 8 lie on either side of said faces; while in Fig. 2 sockets 6 and shoulders 8 are formed at the inner periphery of the outer and inner casings 5 and 7 and adjacent the wheel rim; and in the further modification shown in Fig. 5 the said sockets and shoulders are formed beyond the inner periphery of said casings and at points removed from the wheel rim. In each of these forms the friction between the outer and inner casings is usually sufficient to avoid circumferential slipping of one casing with respect to the other, but for the purpose of positively avoiding such creeping, notches 13 and lugs 14, Fig. 4, adapted to register with each other, are provided in the outer and inner casings respectively.

When the pneumatic tube is inflated the inner casing 7 is extended against the outer tire casing and forces the shoulders 4 of the latter beneath the overhanging portions 3 of the rim flange 2, whereby said outer casing becomes securely locked to said wheel rim. The socket and shoulder connection between the outer and inner casings serves to lock said casings together near their inner periphery.

In the preferred modification shown in Fig. 2 the inner casing is locked so that its inner periphery abuts the wheel rim, and it will be understood, of course, that the shoulder and socket connection merely illustrates one practical and efficient form of locking means.

In the operation of such a tire the expansive pressure of the pneumatic tube is directly sustained by the inner casing 7, this inner casing being adapted to sustain said pressure because its inner periphery is locked in position. Though practically all of this pneumatic pressure is sustained by said inner casing there is no wear on same due to contact with the road, while on the other hand the outer casing sustains all road wear and is completely relieved of the pneumatic pressure within, except for a slight portion of said pressure which is imparted to same in order to keep it well extended and locked to the rim. It will be understood, of course, that this division of forces and function is made possible only by building the outer and inner casings as separate abutting and disconnected members; and it is found in practice that the life of each casing, as employed in this invention, is materially prolonged by being subject only to one distinct type of service. It will be also clear that the thickness of the outer casing is considerably increased by providing an inner casing, and to this extent therefore the vulnerability of the pneumatic tire feature is decreased so that the risk of puncture is considerably lessened. Sometimes also when the outer casing becomes damaged in such manner that it is not safe or expedient to run on same, it may be completely removed and by further expansion of the pneumatic tube the annular shoulders 8 of the inner casing 7, Fig. 2, may be expanded and locked beneath the overhanging flange portions 3, so that the wheel may be temporarily run on the inner casing to a point where a new or repaired outer casing may be secured and replaced over said inner casing.

It is believed, in view of the foregoing description, that the construction and operation of the tire embodying this invention will be clear.

I claim:

In combination a wheel rim having flanges, one on each side of said rim and said flanges extending outwardly from said rim and being turned over toward each other so as to form overhanging flanges; an integral outer tire casing adapted to withstand road strains and having annular externally-projecting shoulders one on each side of said casing, said shoulders being formed so as to fit into said overhanging flanges of the rim, said outer tire casing also having internal overhanging sockets running circumferentially around said outer tire casing and close to its inner periphery; a separate integral inner tire casing adapted to support pneumatic strain impressed upon it from within, said inner tire casing having externally-projecting shoulders on each side and near the inner periphery of said inner tire casing, each of the last said shoulders being adapted to fit within said internal overhanging sockets of the outer tire casing for independently and positively locking said inner tire casing to said outer tire casing, so that the two casings normally hang together and resemble a single casing; and a pneumatic tube within said inner tire casing; said external shoulders of the inner tire casing and internal sockets of the outer tire casing being formed adjacent to said external shoulders on the outer tire casing and being adapted to lie in the space between said overhanging flanges of the wheel rim, so that when the pneumatic tube is inflated pneumatic pressure is imparted directly from said external shoulders on the inner tire casing to the internal sockets and external shoulders on the outer tire casing and to said overhanging flanges of the rim so as to forcibly lock the tire casings to each other and to the wheel rim.

In testimony whereof, I have hereunto set my hand at Los Angeles, California, this 24th day of December, 1912.

FRANK S. BYINGTON.

In presence of—
JAMES R. TOWNSEND,
ROBERT Q. STEPS.